United States Patent Office 3,646,117
Patented Feb. 29, 1972

3,646,117
NITROGEN-CONTAINING DERIVATIVES OF OLIGOMERS OF TETRAFLUOROETHYLENE AND HEXAFLUOROPROPENE
Harold Crosbie Fielding, Northwich, England, assignor to Imperial Chemical Industries Limited, London, England
No Drawing. Original application May 8, 1967, Ser. No. 636,675, now Patent No. 3,502,728, dated Mar. 24, 1970. Divided and this application Sept. 19, 1969, Ser. No. 870,789
Claims priority, application Great Britain, May 23, 1966, 22,866/66
Int. Cl. C07c *143/56*
U.S. Cl. 260—508                                   7 Claims

ABSTRACT OF THE DISCLOSURE

Preparation of nitrogen-containing derivatives of oligomers of tetrafluoroethylene and hexafluoropropene by refluxing an oligomer with a primary or secondary amine in an inert organic solvent whereby fluorine from the oligomer and amino nitrogen-attached hydrogen from the amine are eliminated as hydrogen fluoride and oligomer residue and amine residue become linked through the amino nitrogen atom. The derivatives have empirical formulae QC—$NR_1R_2$ or QC=$NR_2$ where QC is the oligomer residue and $NR_1R_2$ is the amino residue of the amine $NHR_1R_2$ in which $R_1$ and $R_2$ represent alkyl or aryl groups, which may be substituted, and $R_1$ can be hydrogen, and $R_1$ and $R_2$ can form part of a ring system. Preferred reaction solvents are 1,1,2-trifluoro-1,2,2-trichloroethane and methylene chloride, and typical oligomers are tetrafluoroethylene pentamer and hexafluoropropene trimer. Those oligomer derivatives whose $R_1$ and $R_2$ groups contain functional groups particularly sulphonic acid and carboxyl groups, and the corresponding salts and esters thereof, possess pronounced surface-active properties. Examples include derivatives made by reacting tetrafluoroethylene pentamer with diethylamine, allyamine, γ-diethylaminopropylamine, sodium p-aminobenzene sulphonic acid, piperazine, N-ethylethanolamine, and those made by reacting respectively tetrafluoroethylene tetramer, pentamer and hexamer and hexafluoropropene trimer with the polyethylene glycol amino derivative $$NH_2(CH_2CH_2O)_nCH_3$$

This is a division of application Ser. No. 636,675, filed on May 8, 1967 and now U.S. Pat. 3,502,728, issued on Mar. 24, 1970.

BACKGROUND OF THE INVENTION (1) Field of the invention

Chemistry of derivatives of perfluoroolefins.

SUMMARY OF THE INVENTION

Preparation of novel surface-active derivatives of oligomers of tetrafluoroethylene and hexafluoropropene having empirical formulae QC—$NR_1R_2$ or QC=$NR_2$ by reacting an oligomer with a primary or secondary amine $NHR_1R_2$, where QC is the oligomer residue after removal of at least one fluorine atom, and $R_1$ and $R_2$ represent alkyl or aryl groups which may be substituted, and $R_1$ may be hydrogen.

This invention relates to highly fluorinated compounds containing functional groups, particularly to nitrogen-containing compounds derived from oligomers of tetrafluoroethylene and hexafluoropropene.

Oligomers of tetrafluoroethylene are for the purpose of this specification defined as branched-chain internally unsaturated perfluoroolefins having the empirical formula $(C_2F_4)_n$ where $n$ is an integer greater than three and commonly from four to seven, though it can be greater. Likewise oligomers of hexafluoropropene are defined as branched-chain internally unsaturated perfluoroolefins having the empirical formula $(C_2F_6)_n$ where $n$ is 2 or 3. These oligomers can be made by heating respectively tetrafluoroethylene or hexafluoropropene with an ionic catalyst, for example an alkali metal halide, in a polar organic solvent, for example dimethylformamide.

Some of the fluorine atoms in an oligomer molecule can be removed by reactions between the oligomer and compounds containing reactive atoms, for example hydrogen or alkali metal atoms, whereby derivatives of the oligomer are formed. Those containing functional groups generally possess useful surface-active and other properties.

The present invention is concerned with novel oligomer derivatives made by reactions between oligomers and primary or secondary amines whereby fluorine from the oligomer and nitrogen-attached hydrogen from the amine are eliminated as hydrogen fluoride and the oligomer and amine residues become linked through one or more nitrogen atoms. The reactions appear to be general and to be undergone by all types of primary and secondary amines and substituted primary and secondary amines.

If we denote a primary or secondary amine by the empirical formula $NHR_1R_2$ where $R_1$ represents hydrogen or an alkyl or aryl group or a substituted alkyl or aryl group, and $R_2$ represents an alkyl or aryl group or a substituted alkyl or aryl group several reaction sequences falling within the general type are possible. These include:

(i) primary or secondary amine reacting with an

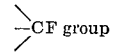

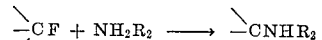

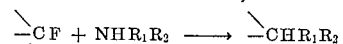

(ii) primary or secondary amine reacting with an oligomer >$CF_2$ group $$>CF_2 + NH_2R_2 \rightarrow >C=NR_2$$
$$>CF_2 + NHR_1R_2 \rightarrow >CFNR_1R_2$$

(iii) primary or secondary amine reacting with an oligomer —$CF_3$ group $$—CF_3 + NH_2R_2 \rightarrow —CF=NR_2$$
$$—CF_3 + NHR_1R_2 \rightarrow —CF_2NR_1R_2$$

Thus the novel oligomer derivatives of the invention have formulae either

QC—$NR_1R_2$ or QC=$NR_2$ where QC is the residue of an oligomer molecule after the removal of at least one fluorine atom and $R_1$ and $R_2$ are as hereinbefore defined.

The invention thus provides highly fluorinated nitrogen-containing derivatives of oligomers of tetrafluoroethylene and of oligomers of hexafluoropropene having empirical formulae QC—$NR_1R_2$ or QC=$NR_2$ where QC is the residue of an oligomer molecule after removal of at least one fluorine atom and $R_1$ and $R_2$ represent alkyl, aryl, substituted alkyl or substituted aryl groups, and $R_1$ may also represent a hydrogen atom, and $R_1$ and $R_2$ may form part of a ring system.

Primary and secondary amines that take part in reactions with oligomers of tetrafluoroethylene and hexafluoropropene include primary and secondary aliphatic amines, which may be unsaturated, and derivatives thereof in which the alkyl groups attached to the nitrogen atom are substituted, for example with hydroxyl, carboxyl or sulphonic acid groups and salts and esters of these, or with other nitrogen-containing groups; primary and secondary aromatic amines and derivatives thereof containing substituents attached to the benzene ring; cyclic secondary amines and polymeric compounds in which the primary or secondary amino group is attached to or incorporated in a polymer chain, for example aminated cellulose and polyethylene imine.

Specific examples of these amines are diethylamine, propylamine, allylamine, ethanolamine, diethanolamine, N-ethylethanolamine $NH(C_2H_5)CH_2CH_2OH$; $\beta$-aminopropionic acid and its ethyl ester, the ethyl ester of N-ethyl-$\beta$-aminopropionic acid $$NH(C_2H_5)CH_2CH_2COOC_2H_5$$

glycine, N-ethyl glycine; sodium $\beta$-aminoethanesulphonate, N-ethyl-$\beta$-aminoethanesulphonic acid $$NH(C_2H_5)CH_2CH_2SO_3H$$

and its salts; $\gamma$-dimethylaminopropylamine $$NH_2(CH_2)_3N(CH_3)_2$$

the polyethylene glycol derivative $NH_2(CH_2CH_2O)_7CH_3$; p-aminobenzenesulphonic acid, p-ethylaminobenzenesulphonic acid, piperazine, ethylene imine.

The reactions between amine and oligomer are conveniently carried out by refluxing the compounds in an inert organic solvent, for example diethyl ether, dimethylformamide, dimethyl sulphoxide, dimethyl ether of diethylene glycol, dioxan, tetrahydrofuran, 1,1,2-trifluoro-1,2,2-trichloroethane, methylene chloride of which 1,1,2-trifluoro-1,2,2-trichloroethane and methylene chloride are particularly useful.

If the oligomer is in excess in the reaction system only one fluorine atom is in general replaced. Sometimes however mixed reaction products are formed as a result of replacement of fluorine atoms attached to more than one carbon atom in the oligomer. This is unavoidable in complex reactions of this type, but the practical value of the products is in no way diminished because in their main uses, which are as surfactants, their presence as mixtures is not necessarily a disadvantage and in fact is often advantageous.

Since the various reactions proceed by elimination of hydrogen fluoride it is sometimes convenient to use the amine itself as the acid acceptor. If however this is inconvenient an acid acceptor such as triethylamine or sodium carbonate may be added to the reaction system.

The compounds of the invention include surface-active agents of several types. For example tetrafluoroethylene pentamer and $\gamma$-dimethylaminopropylamine $$NH_2(CH_2)_3N(CH_3)_2$$

give a product that after quaternisation yields excellent cationic agents, the products from the sodium salt of N-ethyl-$\beta$-aminoethanesulphonic acid or of p-aminobenzenesulphonic acid are good anionic agents, whilst those from the polyethylene glycol derivative $$NH_2(CH_2CH_2O)_7CH_3$$

are good non-ionic agents.

The general reaction whereby the compounds of the invention are made can also be used to introduce polymerisable groups into the fluorocarbon skeleton of the oligomer or to introduce a fluorocarbon residue into a polymer chain. For example when the oligomers react with ethylene imine they give polymerisable intermediates, and when they react with ethanolamine the hydroxyl groups in the products can be esterified to yield polymerisable acrylates and methacrylates. Likewise polymerisable vinyl esters can be made from those products of the invention that contain carboxylic acid functional groups. Some of these polymeric compounds are useful for treating textiles and leather to impart oil- and water-repelling properties thereto.

The invention is illustrated by the examples in which all percentages are by weight.

EXAMPLE 1

Diethylamine (15 g.) in dry diethyl ether (30 mls.) was added dropwise to a stirred solution of tetrafluoroethylene pentamer, $(C_2F_4)_5$ (50 g.) in dry diethyl ether (100 mls.) and the mixture refluxed for one hour. After this the ether solution was washed well with cold water, dried and distilled to give a fraction (50 g.) boiling at 72°–74° C. under 1 mm. Hg. Analysis of this fraction showed it to correspond to the compound having the formula $C_{10}F_{19}N(C_2H_5)_2$.

Found by analysis (percent): C, 30.6; H, 2.1; F, 64.4; N, 3.2. Required for $C_{14}F_{10}NH_{10}$ (percent): C, 30.4; H, 1.8; F, 65.2; N, 2.5.

EXAMPLE 2

Allylamine (1.1 g.) in dry diethyl ether (10 mls.) was added as in Example 1 to tetrafluoroethylene pentamer (10 g.) in diethyl ether (20 mls.). After refluxing for one hour and treatment of the ether solution as in Example 1 a product was obtained shown by analysis to correspond to the compound $C_{10}F_{19}NHCH_2CH=CH_2$.

EXAMPLE 3

N,N-dimethylpropane diamine $NH_2(CH_2)_3N(CH_3)_2$ (204 g.) in 500 mls. of dry diethyl ether was added dropwise to a stirred solution of tetrafluoroethylene pentamer (500 g.) in 500 mls. diethyl ether. When the initial exothermic reaction had died down, the reaction mixture was stirred under reflux for 2 hours, after which it was cooled and the ether layer separated from a lower viscous layer. Distillation of the ether layer gave a pale yellow liquid, which was distilled to give two main fractions. The first, (350 g.) B.P. 68°–72° C. at 1 mm., analysed as the mono-substitution product $C_{10}F_{19}NH(CH_2)_3N(CH_3)_2$.

50 g. of the mono-substitution product was dissolved in diethyl ether (100 mls.) and 21 g. of methyl iodide was added. A solid separated on standing. Recrystallisation from ethanol gave the methiodide $$C_{10}F_{19}NH(CH_2)_3N(CH_3)_2\cdot CH_3I$$

An 0.1% aqueous solution of this methiodide had a surface tension of 21 dynes/cm. at 20° C.

EXAMPLE 4

Tetrafluoroethylene pentamer (100 g.) was added dropwise to a stirred solution of sodium sulphanilate $$(NH_2\cdot C_6H_4\cdot SO_3Na)$$

(39 g.) in dimethylformamide (500 mls.) at 70°–80° C. The dimethylformamide was then removed under reduced pressure, and the residues dissolved in the minimum quantity of water, and the sodium salt precipitated by addition of saturated brine. The solid was filtered off, and dried. Yield 100 g.

Found by analysis (percent): C, 27.5; F, 52.1; N, 2.4; S, 4.4. Required for $C_{10}F_{19}NH\cdot C_6H_4SO_3Na$ (percent): C, 28.4; F, 53.5; N, 2.1; S, 4.7.

A solution of 0.1 g. of product in 100 mls. water showed a surface tension of 24 dynes/cm. at 20° C.

EXAMPLE 5

N-ethylethanolamine (20 g.) in methylene chloride (50 mls.) was added dropwise to a stirred solution of tetrafluoroethylene pentamer (100 g.) in diethyl ether (100 mls.) at 0° C. After 30 minutes the reaction mixture was allowed to warm to room temperature. The organic layer was decanted, washed with water, dried and the solvent and unchanged pentamer removed under vacuum to give a viscous liquid (50 g.), exhibiting hydroxyl-absorption in the infra-red. This liquid was redissolved in methylene chloride, and treated with an excess of acryloyl chloride to give the acrylate. The crude monomer was washed with dilute sodium carbonate, then with water, and then decolourised by heating with active carbon. The resulting monomer (40 g.) polymerised on heating with free-radical catalysts (e.g. t-butyl perbenzoate) to give a polymer which had oil- and water-repelling properties.

EXAMPLE 6

Tetrafluoroethylene pentamer (50 g.) was added dropwise to a stirred solution of piperazine (10 g.) in acetonitrile (100 mls.) at 60° C. The reaction temperature was maintained for ½ hour after completion of the addition, and then was allowed to fall to room temperature. The organic layer was decanted, and acetonitrile and unchanged pentamer were removed under reduced pressure. The remaining residue was distilled to give 25 g. of a pale yellow liquid, B.P. 95°–100° C. at 2 mm.

Found by analysis (percent): C, 29.6; F, 63.8; N, 4.95. Required for $C_{14}F_{19}H_9N_2$ (percent): C, 31.1; F, 63.0; N, 5.14.

EXAMPLE 7

Tetrafluoroethylene pentamer (50 g.) was added dropwise to a stirred solution of a mixture of methoxy (polyethylene glycol) amines (50 g.), of composition $NH_2(CH_2CH_2O)_nCH_3$ where $n$ is approximately 5–10, in diethyl ether (250 mls.). On completion of the addition, the reaction mixture was stirred under gentle reflux for 3 hours and then allowed to cool. The ether solution was decanted from a semi-solid lower layer, and the ether removed to give a viscous liquid, weight 6–5 g. (N, 2.8%, F, 40.3%). A 1% solution of the product in water had a surface-tension of 20 dynes/cm., and a 0.1% solution a surface-tension of 20.5 dynes/cm. at 20° C.

EXAMPLE 8

The reaction of Example 7 was repeated, using tetrafluoroethylene tetramer in place of the pentamer. A viscous liquid was obtained containing 3% of N and 35% of fluorine.

The surface-tension of a 1% aqueous solution was 19.5 dynes/cm. and of a 0.1% solution 20.2 dynes/cm. at 20° C.

EXAMPLE 9

The reaction of Example 7 was repeated using tetrafluoroethylene hexamer, to give a liquid containing 2.2% N and 42% F.

A 0.1% solution in water had a surface-tension of 23 dynes/cm. at 20° C.

EXAMPLE 10

The reaction of Example 7 was repeated using hexafluoropropene trimer, to give a liquid containing 2.8% N and 35.2% F.

A 0.1% solution in water had a surface-tension of 22.5 dynes/cm. at 20° C.

EXAMPLE 11

Cotton cloth was padded with an aqueous solution of polyethyleneimine (approximate molecular weight 40,000) and the cloth dried in warm air. The treated cloth was then immersed in a solution of tetrafluoroethylene pentamer in dioxan at 80° C. After 30 minutes the cloth was removed and dried. Cloth treated in this manner showed both oil- and water-repelling properties.

EXAMPLE 12

Cotton cloth, aminated by treating with an amino pyran, or with dimethylolethylene urea, or with a melamine-based resin, was heated with a solution of tetrafluoroethylene pentamer as in Example 11. The resulting cloth showed both oil- and water-repelling properties, for example against liquid paraffin.

What we claim is:

1. Highly fluorinated nitrogen-containing derivatives of oligomers of perfluoroolefins selected from tetrafluoroethylene and hexafluoropropene of 8 to 14 carbon atoms obtained by reaction in an inert solvent of said oligomers and an amino compound selected from the group consisting of sodium β-aminoethanesulphonate, N-ethyl-β-aminoethanesulphonic acid and its salts, p-amino-benzenesulphonic acid and p-ethylaminobenzenesulphonic acid, after removal of one fluorine atom from said oligomer.

2. Highly fluorinated nitrogen-containing derivatives of oligomers as claimed in claim 1 in which the oligomer is selected from the tetramer, pentamer and hexamer of tetrafluoroethylene.

3. Highly fluorinated nitrogen-containing derivatives of oligomers as claimed in claim 2 in which the oligomer is tetrafluoroethylene pentamer.

4. Highly fluorinated nitrogen-containing derivatives of oligomers of perfluoroolefins as claimed in claim 1 in which the perfluoroolefin is hexafluoropropene.

5. Highly fluorinated nitrogen-containing derivatives of oligomers of hexafluoropropene as claimed in claim 4 in which the oligomer is hexafluoropropene trimer $C_9F_{18}$.

6. Process for making highly fluorinated nitrogen-containing derivatives of oligomers of tetrafluoroethylene and of oligomers of hexafluoropropene comprising reacting in an inert solvent an oligomer of 8 to 14 carbon atoms with an amine selected from the group consisting of sodium β - aminoethanesulphonate, N - ethyl - β - aminoethanesulphonic acid and its salts, p-amino-benzenesulphonic acid and p-ethylaminobenzenesulphonic acid.

7. Process for making highly fluorinated nitrogen-containing derivatives of oligomers as claimed in claim 6 in which the oligomer is selected from the tetramer, pentamer and hexamer of tetrafluoroethylene and the reaction temperature is 0° C. to 80° C. and the inert organic solvent is selected from diethyl ether, dimethylformamide, acetonitrile, methylene chloride and 1,1,2-trifluoro-1,2,2-trichloroethane.

References Cited

UNITED STATES PATENTS 3,502,728   3/1970   Fielding _____ 260—513 R
3,519,682   7/1970   Fielding _____ 260—513

DANIEL D. HORWITZ, Primary Examiner